Patented Feb. 9, 1937

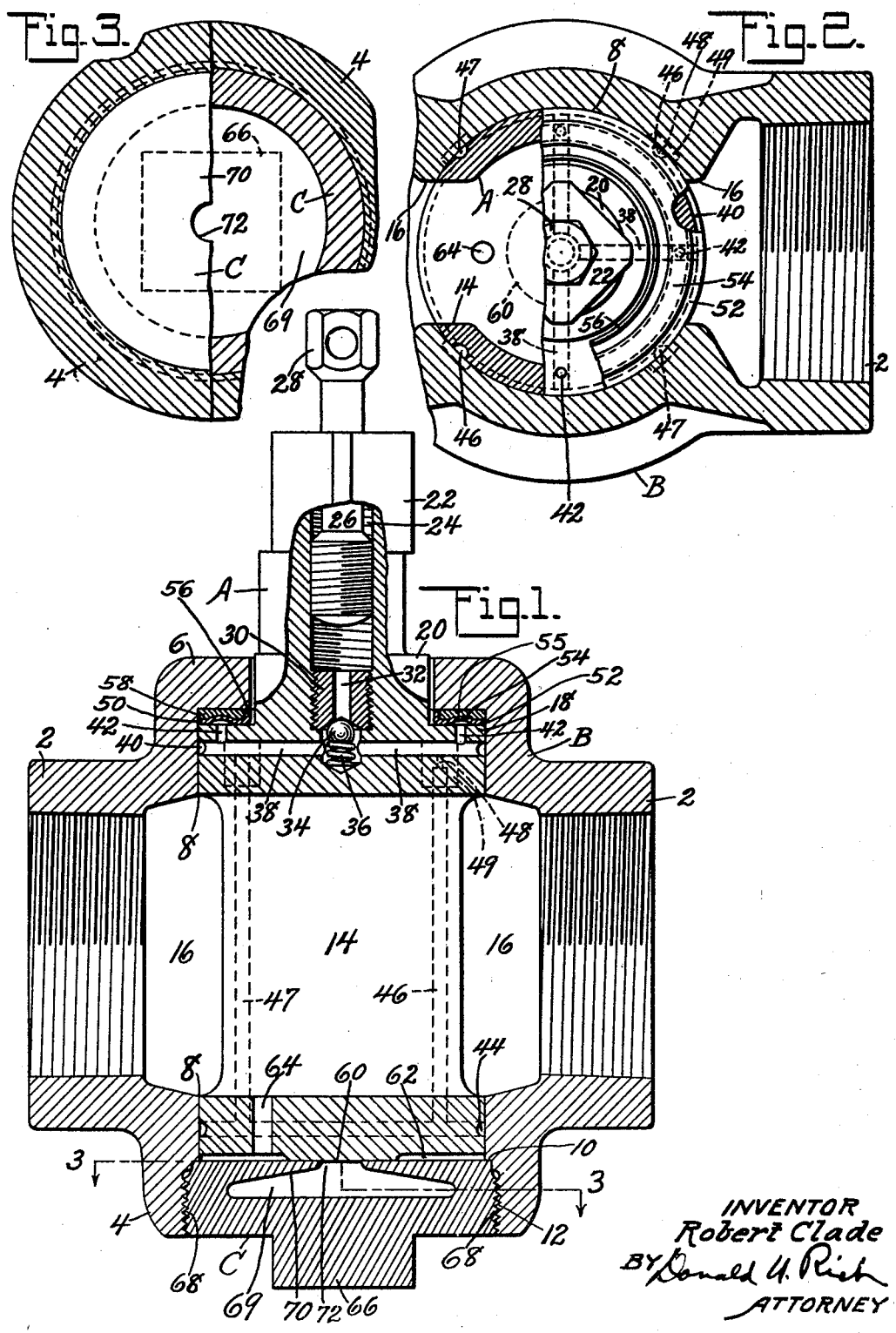

2,070,000

UNITED STATES PATENT OFFICE 2,070,000

LUBRICATED VALVE WITH RESILIENT BASE

Robert Clade, Detroit, Mich., assignor to American Car and Foundry Company, New York, N. Y., a corporation of New Jersey Application May 6, 1936, Serial No. 78,134

4 Claims. (Cl. 251—93)

This invention relates to improvements in valves and particularly to plug valves in which a semi-solid is forced under pressure between the contacting surfaces of the plug and body to lubricate and seal the same and in which the plug may shift axially to permit escape of excess lubricant.

Valves of this general type have been previously constructed but have required exceedingly accurate and expensive machine work and have necessitated the use of independent spring means for urging the plug toward the valve head. The spring means must be preloaded in order that the valve will not shift axially until a certain pressure has been developed which means that a constant relatively heavy pressure exists between the head and plug making the valve relatively hard to operate. It is an object of the invention to provide a lubricated valve in which the plug may shift axially to permit escape of excess lubricant.

Another object of the invention is the provision of a valve wherein the axially shiftable valve plug is held in place without pressure being exerted by the holding means.

A further object of the invention is the provision of a valve having an axially shiftable plug held in position by a slightly resilient cap which will permit shifting of the plug under certain pressure conditions.

These and other objects of the invention will be apparent to those skilled in the art after a study of the following description and accompanying drawing, in which:

Figure 1 is a sectional view of the improved valve, the valve being shown in the open position;

Fig. 2 is a staggered sectional view through the upper portion of the valve shown in Fig. 1, and Fig. 3 is a sectional view showing the resilient plug and taken on line 3—3 of Fig. 1.

Referring now more particularly to the drawing, in which similar characters of reference designate similar parts in the several views, the valve of the present invention comprises three main parts, namely, the plug A, the valve casing or body B and a base plate or closure cap C.

The valve body is of more or less conventional form being provided with threaded pipe connecting portions 2, an open lower end or base portion 4, and a head portion 6 formed, in the instance shown, integral with the body. The interior of the valve body is formed to provide a cylindrical bore B constituting a seating surface for the plug A. As shown clearly in Fig. 1, the lower end portion of the body is slightly enlarged to provide an annular shoulder 10 constituting an abutment against which the base plate C engages.

The valve plug A is substantially cylindrical in form to engage the seating surface 8 and is provided with a port opening 14 adapted to be alined with the ports in the body when the valve is in open position. The upper end portion of the plug A is formed with a plane surface 18 constituting a shoulder surrounding the stem 20 which extends upwardly through the head portion 6 of the valve body and is formed to provide a wrench receiving portion 22. The stem 20 is provided with a threaded passageway 24 constituting a lubricant reservoir; the reservoir receiving a ram 26 having an operating head 28. Secured in the lower end portion of the reservoir 24 is a valve seat member 30 provided with an opening 32 therethrough which is normally closed by a ball check valve 34 seated against the opening by a spring 36. A transverse lubricant duct 38 is provided in the upper end portion of the plug which extends entirely through the plug and connects with an upper arresting or sealing groove 40 formed circumferentially in the plug. As shown clearly in Fig. 1, the duct 38 is so arranged as to receive lubricant from the reservoir 24 upon actuation of the ram 26. Feeder ducts 42 are provided which lead from the transverse duct 38 through the upper end portion of the plug.

Formed in the plug adjacent the lower end portion thereof is a circumferential bottom arresting or sealing groove 44 which is connected with the upper sealing grooove 40 by a plurality of vertical ducts 46 and 47 formed in the plug on either side of the port opening thereof. The ducts 47 are of uniform width from top to bottom as shown clearly in Fig. 1, while the ducts 46 are each provided with a restricted portion 48 at their upper ends to limit the flow of lubricant through said ducts in certain positions of the plug. Formed in the body B, adjacent the head portion 6 thereof, are recesses 49 arranged respectively adjacent the edges of the port openings of said body with which the upper end portions of the ducts 46 and 47 are adapted to cooperate for permitting free passage of lubricant from the upper grooove 40 into said ducts 46 and 47. While Fig. 1 shows the longitudinal or plug ducts 46 and 47 each extending to and directly communicating with the lower arresting groove 44, it is obvious that if desired, one or more of said ducts may terminate short of the grooove 44.

In valves of the type disclosed herein, it has been the practice to prevent leakage of line pressure through the head by arranging the plug and body in such a manner as to effect a metal-to-metal sealing contact. This obviously requires accurate machining of the cooperating parts. To eliminate the extremely accurate machine work necessary for a metal-to-metal sealing contact, and still provide a means for sealing the valve against head leaks, the present invention provides a sealing element interposed between the upper end portion of the plug and the head portion, and more particularly between the shoulder 18 and the head portion 6. This element comprises a composite structure formed of cooperatively associated annuli of metal and fiber or other resilient and preferably compressible means. In the instance shown in the drawing a metal annulus 50 is provided which rests upon and is supported by the shoulder 18 and is formed with flat portions 52 and an intermediate raised portion 54 which provides a downwardly facing lubricant groove 55 which completely surrounds the stem 20. The groove 55, as clearly shown in Fig. 1, is arranged immediately above the feeder ducts 42 whereby to receive lubricant therefrom as hereinafter more fully described. The sealing element also includes a resilient member 58 which may be formed of fibrous material—rubber, or the like— and said element 58 is formed complemental with the metal annulus 50 so as to snugly seat thereon. The annulus 50 is provided with an upwardly projecting flange 56 which surrounds the stem 20 and serves as a retainer to prevent shifting of the resilient member 58.

The lower end portion of the plug A is provided with a projecting lug 60 which rests upon the base plate C and serves to space the remaining portion of the lower end of the plug from said base plate, as clearly seen in Fig. 1. Formed in the base of the plug is an aperture 64 which serves to vent any lubricant or line pressure which may be trapped within the plug, when the latter is turned to closed position, out of said plug. It will be apparent that with the plug in a closed position and line pressure exerted thereagainst, the plug will shift radially in the body. When the plug is in this position, should an operator force lubricant from the reservoir 24, lubricant may pass into the plug and, in the absence of an aperture 64, a high pressure would be developed within the plug. Sometimes the pressure may be of such an amount as to cause bursting of the plug. The provision of the aperture 64 eliminates the possibility of the development of bursting pressures within the plug inasmuch as any lubricant which may pass into the interior of the plug will be forced out of the plug through the aperture 64. The base plate C is formed preferably as a unitary structure having a wrench receiving portion 66 with threads 68 by which the cap may be secured to the valve body. The base plate C may be a casting and is preferably provided with a cavity 69. The base plate C also includes an annular extension 70 of tapering form constituting a supporting element for the plug and with which the lug 60 engages. In other words, the base plate C is provided with a tapering wall 70 constituting a supporting element and said wall is provided with a substantially centrally arranged opening 72. The wall 70 is of gradually increasing thickness toward the threaded side edge portions 68 of the base plate whereby said wall possesses a certain amount of resilience and is yieldable against downward axial movement of the valve plug, as hereinafter described. It is to be understood that while the base plate C, and more particularly the supporting portion 70 thereof, constitutes a bearing element for the plug in that it supports the latter, the wall 70 transmits no appreciable upward thrust to the plug, thus insuring an easily operable valve.

In operation, the lubricant for the valve is retained in the reservoir 24 and operation of the ram 26 will force lubricant past the check valve 34 and through the transverse duct 38 to the upper arresting groove 40 and through the feeder ducts 42 to the lubricant groove 55 at the upper or head portion of the valve. Lubricant will also pass from the arresting groove 40 into the vertical ducts 46 and 47 to the lower arresting groove 44. The grooves 46 and 47 constitute feeder means for the lubricant, and operation of the valve from closed to open position will cause lubricant to pass from the ducts 46 and 47 to the contacting or seating surfaces of the valve body and plug. It will be obvious that after the valve has been fully lubricated, further operation of the ram 26 to force more lubricant from reservoir 24 will result in building up a pressure in the lubricant groove 55 at the head portion of the valve which will be in excess of the combined action of line pressure acting against the lower end portion of the plug and the resilience of the supporting element 70 of the base plate, and the plug will shift axially in the body against the supporting element 70 and lubricant at the head portion of the valve may escape from the groove 55 to the atmosphere by passing beneath the metal annulus 50 and then out of the valve body between the stem and the head portion, thus giving a visual signal that the valve is fully lubricated and further prevent overlubrication of the valve and also the building up of bursting pressures of any sort.

From the above description it is obvious that the lubricated valve of the present invention comprises one in which the plug is held in proper position without any heavy preloading as is necessary in the use of a spring but the plug is permitted to shift axially in the body due to the resiliency of the metal of the base plate and the particular conformation thereof. It will be further obvious that the valve of the present invention provides a construction in which head leaks are entirely eliminated by the provision of a lubricant seal at the head portion and it will be further apparent that the sealing element provided for the present valve is one which may be easily replaced should occasion demand. The drawing illustrates one embodiment of the invention but it is apparent that various changes in the form and proportions of the construction may be made within the scope of the appended claims without departing from the spirit of the invention.

What is claimed is:

1. As an article of manufacture, a base plate for valve bodies comprising a substantially cylindrical externally threaded member having an internal cavity substantially closed by walls of decreasing thickness towards the central axis of said member.

2. As an article of manufacture, a base plate for valve bodies comprising a substantially cylindrical member having screw threads on its periphery, said member having a cavity therein, and an upwardly tapering wall substantially closing said cavity.

3. As an article of manufacture, a base plate for valve bodies comprising a unitary member having a recess therein defined at least in part by an annular wall of increasing thickness towards the periphery of said member.

4. In a lubricated valve, a valve body having a head portion, a shouldered plug rotatably mounted in said body, sealing means interposed between the plug shoulder and said head portion and including an annular member provided with a downwardly facing recess cooperating with said shoulder to provide a lubricant receiving groove, means for forcing lubricant under pressure into said groove, a base plate supporting said plug in the body and formed with an internal recess substantially covered by a wall which gradually decreases in thickness toward the central axis of said plate whereby to provide a resilient member adapted to yield upon axial movement of the plug in the body.

ROBERT CLADE.